Nov. 28, 1933. R. R. WORRALL 1,937,304
CONVEYER CHAIN AND SPROCKET WHEEL THEREFOR
Filed Aug. 4, 1930
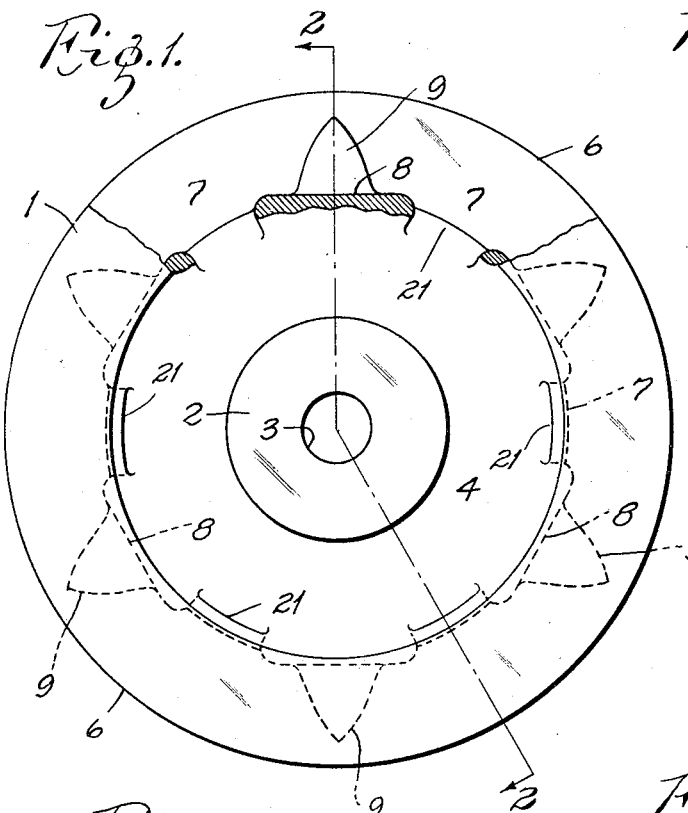
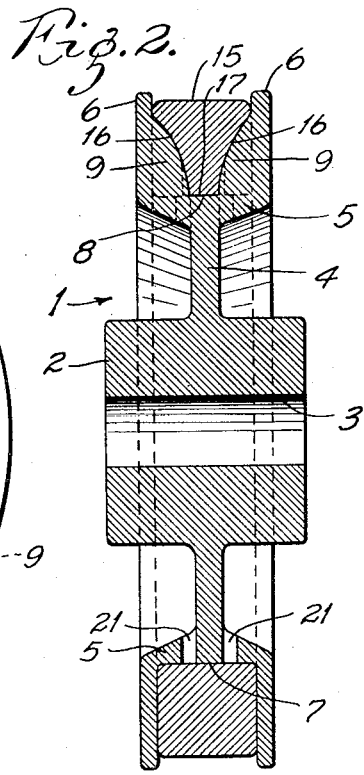
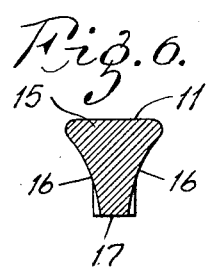
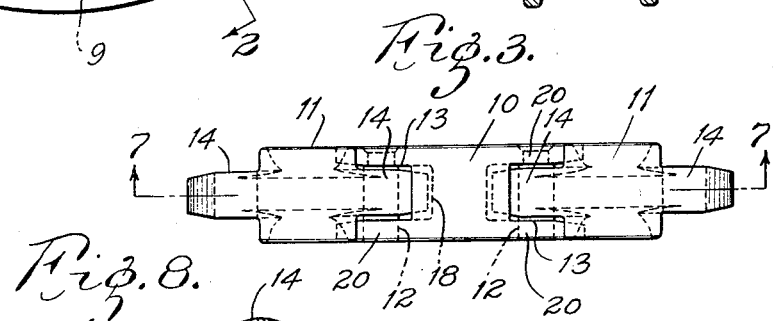
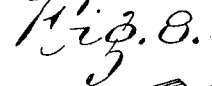
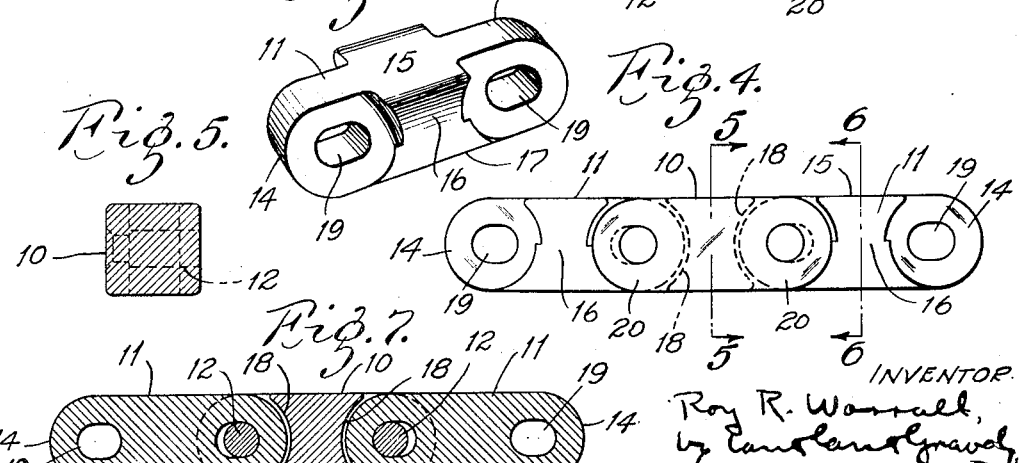
INVENTOR
Roy R. Worrall,
by Campbell and Gravely,
HIS ATTORNEYS.

Patented Nov. 28, 1933

1,937,304

UNITED STATES PATENT OFFICE 1,937,304

CONVEYER CHAIN AND SPROCKET WHEEL THEREFOR

Roy R. Worrall, Webster Groves, Mo., assignor to Alvey Conveyor Manufacturing Co., St. Louis, Mo., a corporation of Missouri Application August 4, 1930. Serial No. 472,856

11 Claims. (Cl. 198—189)

My invention relates to conveyer chains which are supported and driven by sprocket wheels. In many industries, such as the dairying industry wherein conveyer chains are used extensively and sanitation is an important factor, it is desirable to keep the conveyer chains as clean as possible and also insure smooth operation thereof. The principal object of this invention is to devise a conveyer chain having practically no pockets or recesses in which dirt can collect, and also suitable sprocket wheels for driving and carrying said chain that, upon engaging said chain, will help to clean the same and suitably dispose of any dirt or foreign matter that may collect thereon.

A further object of my invention is to provide a sprocket wheel that will prevent articles riding over the same from being caught, bumped or jostled in any manner.

My invention consists principally in a conveyer chain and a sprocket wheel therefor wherein the teeth of said sprocket wheel extend inwardly from the edges of a peripheral groove provided around said sprocket wheel, and engage the sides of said chain tending to scrape any dirt collected on said chain whenever said teeth and said chain come in contact with each other. It also consists in suitable means for removing any dirt that may be scraped from said chain and lodged between said chain and said sprocket wheel. My invention further consists in raising the edges of the sprocket wheel, between which the chain passes, above the top of said chain, so that articles riding over said sprocket wheel will not be caught or jostled in any manner, and which will insure smooth operation of the chain as a conveyer. My invention also consists in the parts, combinations and arrangements of parts hereinafter described and claimed.

In the accompanying drawing, which forms part of this specification and wherein like reference numerals refer to like parts wherever they occur, Fig. 1 is a side view, with parts broken away, of a sprocket wheel embodying my invention, Fig. 2 is a section along the line 2—2 of Fig. 1, showing also sections through a conveyer chain, Fig. 3 is a plan view of a chain embodying my invention, Fig. 4 is a side view of the chain shown in Fig. 3, Fig. 5 is a section along the line 5—5 of Fig. 4, Fig. 6 is a section along the line 6—6 of Fig. 4, Fig. 7 is a section along the line 7—7 of Fig. 3; and Fig. 8 is a perspective view of a mortise link of my chain.

In the construction illustrated, a sprocket wheel 1 embodying my invention, and preferably of integral construction, comprises a usual central hub 2 with a core opening 3 extending therethrough. Extending from the central peripheral portion of said hub 2 is an annular web 4 provided with a peripheral flange 5, each end of said flange 5 being provided with an annular flange 6 which forms outside edges of an annular rectangular shaped trough or groove 7 for engaging a conveyer chain.

Provided at regular intervals in said grooves 7 are raised flat portions 8 which constitute a base for half conical shaped sprocket teeth 9 whose base portions extend inwardly from each edge of the groove to about one-third the width of said groove, whereas said teeth taper toward the edges of said groove to form tips in close proximity to the outer end of said sprocket wheel. Each tooth which extends inwardly from one edge of the groove is located adjacent an opposite tooth which extends inwardly from the other edge of said groove, and both of which cooperate with each other and form similar sets of teeth around said sprocket wheel and which act together as one tooth of an ordinary sprocket wheel.

The chain illustrated and particularly adapted for use with the above described sprocket wheel comprises a plurality of mortise links 10, between each of which is interposed a peculiarly shaped tenon link 11 and which are held together by suitable pins 12. Each mortise link 10, which is of symmetrical shape both in a vertical and longitudinal direction, is H-shaped having an opening 13 at each end for receiving a tenon 14 extending from the companion tenon link 11, and said mortise link has flat surfaces on both the top and bottom thereof.

Each tenon link comprises a main central body portion 15 which is of the same width on the top as that of a mortise link, however, the sides of the main body portion 15 are curved inwardly at 16 terminating in a narrow flat bottom portion 17. It is obvious, in this connection, that when using said chain in connection with the sprocket wheel embodying my invention, the exact shape of the side curved portions 16 of said link are determined by the shape of the inner portions of the sprocket teeth 9, as said teeth are adapted to engage said curved side portions and scrape the sides of all portions thereof thoroughly. Extending from both the forward and rear part of the central body portion 15 of said tenon link are the tenons 14 whose ends thereof are rounded to form a semi-cylindrical surface which loosely fits into a semi-cylindrical recess 18 provided in the cross portion of the companion mortise link.

Each tenon is provided with a slot 19 which is of greater length than height and which is adapted to receive the pins 12 which extend through openings in the mortise legs 20, said pins being press-fitted in said openings for securing them against removal during operation. As the tenons 14 loosely engage the mortise openings, it is obvious that the chain is capable of permitting universal action as each link may rotate a slight distance horizontally, besides the normal rotation around the axis of the connecting pin.

Since the shape of the teeth 9 provided on the sprocket wheel are adapted so as to completely engage the sides of the cooperating curved side portions 16 of the tenon link, and since the sides of the groove of said sprocket wheel directly engage the sides of the mortise link, any dirt or undesirable matter that may collect on the chain will be scraped from the sides of said chain upon rotation of the sprocket wheel, and said dirt will then become lodged in the space located between each set of teeth and between said chain and the bottom of the peripheral groove 7. In order to free the sprocket wheel of such dirt, the bottom of the groove is provided with openings 21 which extend through the peripheral flange 5 and which allow the dirt to fall therethrough by gravity as the sprocket wheel rotates.

The advantages of my chain are obvious. It is readily understood that conveyer chains of the ordinary type regardless of the construction thereof, will undoubtedly collect a certain amount of dirt, resulting in dirty and usually unsanitary conditions. As my chain is of such a construction that there are no pockets or recesses wherein dirt can collect thereon, and also, since the sprockets are so designed to thoroughly scrape the sides of said chain to remove any dirt that may collect, an adequate protection against my chain becoming dirty and remaining so is afforded. A further advantage of my chain and sprocket wheel is that the chain is capable of universal action, is of simple construction and the sprocket wheel is so designed that articles passing thereover will not be jostled or bumped.

Another advantage is that my chain is provided with a large flat top carrying surface, and the bottom portion of a plurality of links offers sufficient bearing surface to insure thorough stability.

Obviously as certain features of the construction illustrated may be varied without departing from the spirit and scope of my invention, I do not wish to be limited to the construction hereinbefore described.

What I claim is:

1. The combination of a conveyer chain and a sprocket wheel, said sprocket wheel being provided with an annular trough shaped periphery, said trough being provided at regular intervals with raised flat portions, oppositely disposed pairs of sprocket teeth extending from the edges of said trough inwardly whose bottom portions extend from the central portion of said flat portions and whose top portions merge into the sides of said groove before reaching the outer end thereof, and said chain being provided at regular intervals with side portions which are curved from a wide top surface to a narrow bottom portion and which are correspondingly curved for receiving said sprocket teeth on each side.

2. A conveyer chain comprising a plurality of H-shaped mortise links, tenon links interposed between each mortise link and held together by pins, each tenon link having a wide flat top surface and the sides of each being curved inwardly to form a narrow flat bottom surface.

3. A link for a conveyer chain provided at each end with tenons which extend from the main body portion which is flat at the top and whose sides are curved inwardly to form a narrow bottom portion which is slightly narrower than the width of the tenons.

4. The combination of a conveyer chain and a sprocket wheel, said sprocket wheel being provided with a parallel-sided peripheral groove, teeth extending inwardly from the sides of said groove, and holes at the bottom of the groove, the top of said conveyer chain being of substantially the same width as said groove and comprising links of one series with parallel sides alternating with links of a second series with sides recessed to accommodate said teeth.

5. The combination of a conveyer chain and a sprocket wheel, said sprocket wheel having a parallel-sided groove in its periphery and oppositely disposed pairs of teeth extending inwardly from the sides of said groove, and said conveyer chain having flat-sided links of substantially even width with said groove alternating with links whose sides are recessed to accommodate said teeth.

6. The combination of a conveyer chain and a sprocket wheel, said sprocket wheel having a parallel-sided groove in its periphery of somewhat greater depth than the chain and oppositely disposed pairs of teeth extending inwardly from the sides of said groove, and said conveyer chain having flat-sided links of substantially even width with said groove alternating with links whose sides are recessed to accommodate said teeth.

7. The combination of a conveyer chain and a sprocket wheel, said sprocket wheel having a parallel-sided groove in its periphery and oppositely disposed pairs of teeth extending inwardly from the sides of said groove, and said conveyer chain having parallel-sided links of substantially even width with said groove alternating with links whose sides converge downwardly to accommodate said teeth.

8. The combination of a conveyer chain and a sprocket wheel, said sprocket wheel being provided with a parallel-sided peripheral groove, teeth of semi-conical form extending inwardly from the sides of said groove, and holes at the bottom of the groove, the top of said conveyer chain being of substantially the same width as said groove and comprising links of one series with parallel sides alternating with links of a second series whose sides converge downwardly to accommodate said teeth.

9. The combination of a conveyer chain and a sprocket wheel, said sprocket wheel being provided with a parallel-sided peripheral groove, teeth extending inwardly from the sides of said groove, and holes at the bottom of the groove, the top of said conveyer chain being substantially flat and of substantially the same width as said groove and comprising parallel-sided links with grooves in their ends alternating with links provided at their ends with tenons which enter the grooves of adjacent links and are pivotally connected to the walls thereof, the sides of said last mentioned links converging downwardly.

10. The combination of a conveyer chain and a sprocket wheel, said sprocket wheel having a parallel-sided groove in its periphery and oppositely disposed pairs of teeth extending inwardly from the sides of said groove, and said conveyer chain having substantially parallel-sided links of substantially even width with said groove alternating with links of like width at the top end whose sides converge downwardly to accommodate said teeth, said last mentioned links having rounded tenons in their ends, which fit loosely between and are pivotally connected to spaced rounded tenons at the ends of said first mentioned links, the rounded surfaces of the tenons substantially merging into the top surfaces of the links and the pivotal connections being close to the centers of curvatures.

11. The combination of a conveyer chain and a sprocket wheel, said sprocket wheel having a parallel-sided groove in its periphery of somewhat greater depth than the chain and oppositely disposed pairs of teeth extending inwardly from the sides of said groove, and said conveyer chain having substantially parallel-sided links of substantially even width with said groove alternating with links of like width at the top and whose sides converge downwardly to accommodate said teeth, said last mentioned links having rounded tenons in their ends, which fit loosely between and are pivotally connected to spaced rounded tenons at the ends of said first mentioned links, the rounded surfaces of the tenons substantially merging into the top surfaces of the links and the pivotal connections being close to the centers of curvatures.

ROY R. WORRALL.